Patented Feb. 3, 1925.

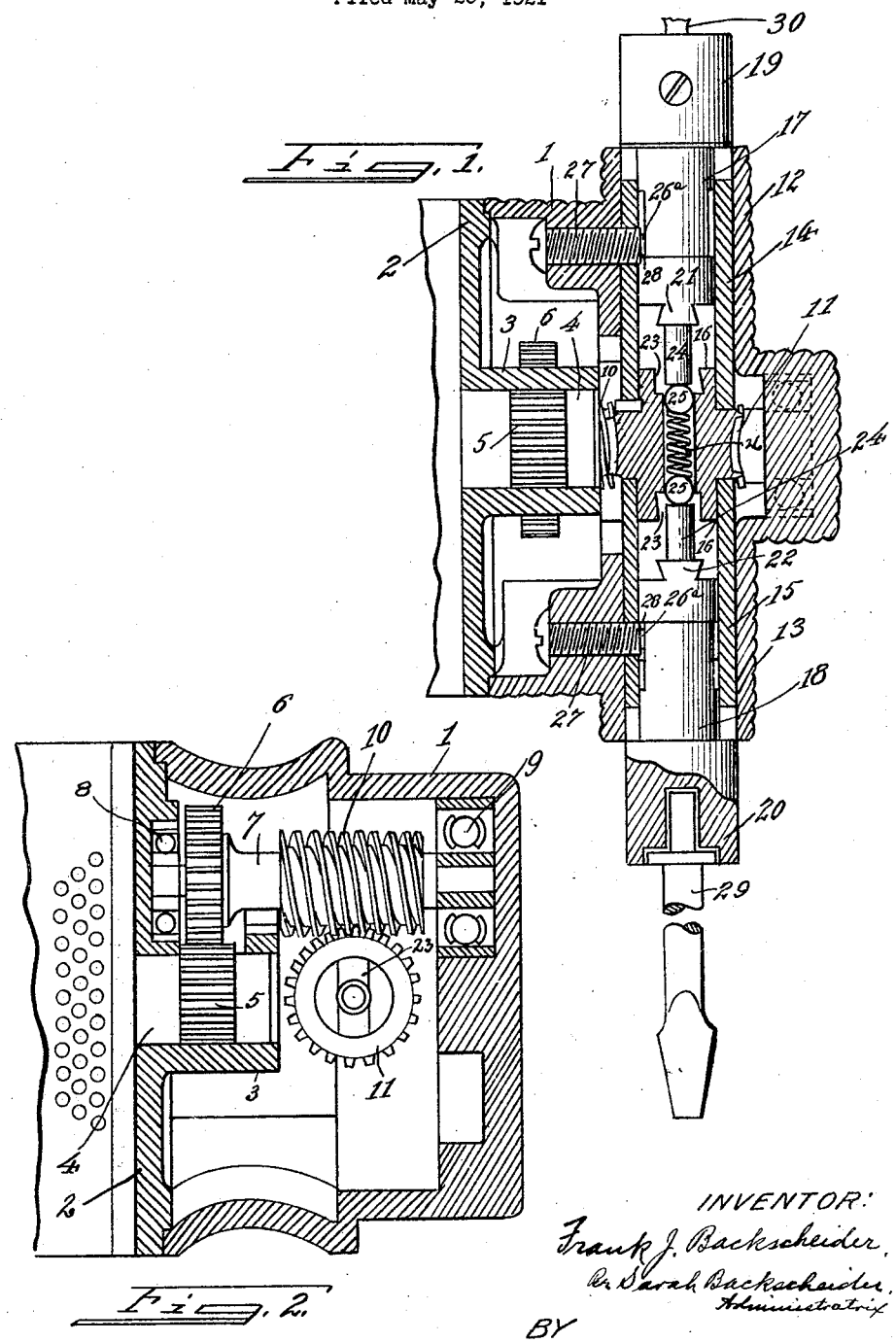

1,525,357

UNITED STATES PATENT OFFICE.

FRANK J. BACKSCHEIDER, DECEASED; BY SARAH BACKSCHEIDER, ADMINISTRATRIX, OF CINCINNATI, OHIO.

PORTABLE ELECTRIC TOOL.

Application filed May 25, 1921. Serial No. 472,614.

*To all whom it may concern:*

Be it known that FRANK J. BACKSCHEIDER, late a citizen of the United States, of whose estate I, SARAH BACKSCHEIDER, a citizen of the United States, and resident of Cincinnati, Hamilton County, Ohio, am the duly appointed and qualified administratrix, did in his lifetime invent certain new and useful Improvements in Portable Electric Tools, of which the following is a full, clear, and exact description, reference being had to the accompanying drawings, forming a part of this specification.

This invention relates to portable electric tools.

The principal object of the present invention is to provide in a portable electric tool spindles disposed at right angles axially to the principal axis of the tool, together with suitable automatic clutch mechanism whereby either of the spindles will be, by the operation suitable for bringing it into position for work, operatively coupled with the drive mechanism of the tool.

Further objects of the invention will appear from the following detailed description thereof.

In the drawings:

Figure 1 is a section of a portion of the tool taken on the axis of the tool spindles.

Figure 2 is a sectional view on a plane at right angles to the tool spindles.

The numeral 1 indicates the gear casing of a portable electric tool. The gear casing is separated from the motor casing of the tool by means of a division plate 2, provided with a sleeve 3 for the armature shaft 4 of the motor; the shaft 4 is provided with a pinion 5, which is arranged to mesh through an opening in the sleeve 3, with a gear 6 rigidly mounted on a worm shaft 7, the said shaft having bearings 8 and 9 in opposite ends of the gear casing 1; the shaft 7 is provided with a worm 10 which engages the teeth of a worm gear 11.

The casing is provided with spindle sleeves or extensions 12 and 13, the same having bushings 14 and 15, the inner ends of which serve as bearings for the cylindrical extensions 16 of the worm gear 11. Rotatably mounted in the bushings are spindles 17 and 18, provided with tool chucks 19 and 20. The inner ends of the spindles 17 and 18 are provided with under-cut clutch members 21 and 22, arranged to engage in undercut slots 23 in the ends of the cylindrical portions 16 of the worm gear 11. The inner faces of the clutch members 21 and 20 are provided with pins 24 arranged to press against balls 25 fitted in an axial bore in the worm gear 11. A spring 26 interposed between the balls 25 forces the same outwardly against the pins 24. Short pins 26$^a$, carried by screws 27, are arranged to engage shoulders 28 of the spindles to limit their outward movements. The bushings 14 and 15 terminate sufficiently far inside the sleeves 12 and 13 to permit the chucks 19 and 20 such longitudinal movement as is necessary to permit the clutch members 21 and 22, engaging in the respective slots 23. The chucks 19 and 20 are adapted to receive suitable tools, as for instance, screw-drivers 29 and 30, which will be driven in opposite directions, thus permitting the driving or withdrawing of screws by simply turning the tool to bring the desired spindle in operative relation.

The operation of the device will be apparent to those skilled in the art to which the same appertains.

The worm gear 11, carrying two clutch members one for each of the respective spindles, is constantly driven through the worm 10 and gears 5 and 6. Either spindle is brought into operative engagement with the respective clutch member simply by placing the tool in its chuck against the work; this forces the spindle inwardly against the compression of the spring 26 and permits the engagement of the respective clutch members. When the tool is withdrawn from the work the spindle is automatically disengaged by the action of the spring 26. The spindles being driven in opposite directions, the tools carried by the respective chucks are similarly driven, and therefore the tool equipped with the combination of spindles and clutch members, above described, is peculiarly adapted for the driving and withdrawing of screws.

The under-cutting of the clutch members causes the same to remain in engagement so long as there is any torsional stress between the same, even though longitudinal pressure has been removed from the tool, as would be the case particularly in withdrawing screws.

Having thus fully described this invention what I claim as new and desire to secure by Letters Patent is:

1. In a device of the character specified, the combination with a pair of slidably mounted aligned spindles, a gear for actuating either of said spindles operatively mounted between the ends of said spindles and axially aligned therewith, clutch members formed on said spindles and on the opposite faces of said gear, the spindle clutch members being arranged to engage the correlated clutch members on the gear when either of the spindles is forced inwardly in its slidable mounting, a pin on each of the spindle clutch members, said pins being adapted to enter an axial bore in the gear when the related pair of clutch members are in engagement, and means in said bore arranged to bear against the pin of the operative clutch members for forcing said spindle away from said gear automatically to disengage said clutch members when a tool in said spindle is relieved of pressure.

2. In a device of the character specified, the combination with a pair of slidably mounted aligned spindles, a gear for actuating either of said spindles operatively mounted between the ends of said spindles and axially aligned therewith, clutch members formed on said spindles and on opposite faces of said gear, the spindle clutch members being arranged to engage the correlated clutch members on the gear when either of the spindles is forced inwardly in its slidable mounting, a pin on each of the spindle clutch members, said pins being adapted to enter an axial bore in the gear when the related pair of clutch members are in engagement; two balls in said bore, a spring interposed between said balls, each of said balls being arranged to bear against one of the pins for forcing the related spindle away from the gear automatically to disengage said clutch members when a tool in said spindle is relieved of pressure.

3. In a device of the character specified, the combination with a pair of axially aligned bushings, spindles slidably mounted in said bushings, a gear for actuating either of said spindles, said gear having cylindrical extensions on opposite faces, said extensions being mounted in the ends of the respective bushings, clutch members formed on said spindles and on opposite faces of said gear, the spindle clutch members being arranged to engage the correlated clutch members on the gear when either of the spindles is forced inwardly in its slidable mounting; a pin on each of the spindle clutch members, said pins being adapted to enter an axial bore in the gear when the related pair of clutch members are in engagement, and means in said bore arranged to bear against the pin of the operative clutch member for forcing said spindle away from said gear automatically to disengage said clutch members when a tool in said spindle is relieved of pressure.

4. In a device of the character specified, the combination with a pair of axially aligned bushings, spindles slidably mounted in said bushings, a gear for actuating either of said spindles, said gear having cylindrical extensions on opposite faces, said extensions being mounted in the ends of the respective bushings, clutch members formed on said spindles and on opposite faces of said gear, the spindle clutch members being arranged to engage the correlated clutch members on the gear when either of the spindles is forced inwardly in its slidable mounting, a pin on each of the spindle clutch members, said pins being adapted to enter an axial bore in the gear when the related pair of clutch members are in engagement; two balls in said bore, a spring interposed between said balls each of said balls being arranged to bear against one of the pins for forcing the related spindle away from the gear automatically to disengage said clutch members when a tool in said spindle is relieved of pressure.

SARAH BACKSCHEIDER,
*Administratrix of Frank J. Backscheider, Deceased.*